United States Patent
Tabirian et al.

(10) Patent No.: US 9,976,911 B1
(45) Date of Patent: May 22, 2018

(54) FULL CHARACTERIZATION WAVEFRONT SENSOR

(71) Applicant: Beam Engineering for Advanced Materials Co., Orlando, FL (US)

(72) Inventors: Nelson V. Tabirian, Winter Park, FL (US); Zhi J. Liao, Apopka, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 0 days. days.

(21) Appl. No.: 15/196,679

(22) Filed: Jun. 29, 2016

Related U.S. Application Data

(60) Provisional application No. 62/186,622, filed on Jun. 30, 2015.

(51) Int. Cl.
*G01J 9/00* (2006.01)

(52) U.S. Cl.
CPC .......... *G01J 9/00* (2013.01); *G01J 2009/002* (2013.01)

(58) Field of Classification Search
None
See application file for complete search history.

(56) References Cited

U.S. PATENT DOCUMENTS

| | | |
|---|---|---|
| 2,435,616 A | 2/1948 | Vittum |
| 3,721,486 A | 3/1973 | Bramley |
| 3,897,136 A | 7/1975 | Bryngdahl |
| 4,160,598 A | 7/1979 | Firester et al. |
| 4,301,023 A | 11/1981 | Schuberth |
| 4,698,816 A | 10/1987 | Chun |
| 4,956,141 A | 9/1990 | Allen |
| 4,983,332 A | 1/1991 | Hahn |
| 5,032,009 A | 7/1991 | Gibbons |
| 5,042,950 A | 8/1991 | Salmon, Jr. |
| 5,047,847 A | 9/1991 | Toda |
| 5,100,231 A | 3/1992 | Sasnett et al. |
| 5,142,411 A | 8/1992 | Fiala |

(Continued)

FOREIGN PATENT DOCUMENTS

| | | |
|---|---|---|
| EP | 1970734 | 9/2008 |
| EP | 2088456 | 12/2009 |

(Continued)

OTHER PUBLICATIONS

Yin, Xiaoming, et al. "Adaptive thresholding and dynamic windowing method for automatic centroid detection of digital Shack-Hartmann wavefront sensor." Applied optics 48.32 (2009): 6088-6098.*

(Continued)

*Primary Examiner* — Shawn Decenzo
(74) *Attorney, Agent, or Firm* — Brian S. Steinberger; Law Offices of Brian S. Steinberger, P.A.

(57) ABSTRACT

Sensors, devices, apparatus, systems and methods for replacing microlens arrays with one or more switchable diffractive waveplate microlens arrays for providing measurements of wavefronts and intensity distribution in light beams with high spatial resolution with a single optical radiation sensor. The device acts like a conventional Shack-Hartmann wavefront sensor when the microlens array elements are in focusing state, and the device performs light beam intensity profile characterization acting as a beam profiler when the optical power of lens array elements is switched off.

12 Claims, 4 Drawing Sheets

(56) References Cited

U.S. PATENT DOCUMENTS

| | | |
|---|---|---|
| 5,150,234 A | 9/1992 | Takahashi |
| 5,218,610 A | 6/1993 | Dixon |
| 5,325,218 A | 6/1994 | Willett |
| 5,446,596 A | 8/1995 | Mostrorocco |
| 5,621,525 A | 4/1997 | Vogeler et al. |
| 5,895,422 A | 4/1999 | Hauber |
| 5,903,330 A | 5/1999 | Funschilling |
| 5,989,758 A | 11/1999 | Komatsu |
| 6,107,617 A | 8/2000 | Love et al. |
| 6,139,147 A | 10/2000 | Zhang |
| 6,170,952 B1 | 1/2001 | La Haye |
| 6,191,880 B1 | 2/2001 | Schuster |
| 6,219,185 B1 | 4/2001 | Hyde |
| 6,320,663 B1 | 11/2001 | Ershov |
| 6,373,549 B1 | 4/2002 | Tombling |
| 6,452,145 B1 | 9/2002 | Graves et al. |
| 6,551,531 B1 | 4/2003 | Ford |
| 6,678,042 B2 | 1/2004 | Tabirian et al. |
| 6,728,049 B1 | 4/2004 | Tabirian et al. |
| 6,792,028 B2 | 9/2004 | Cook |
| 6,911,637 B1* | 6/2005 | Vorontsov ............... G01J 9/00 250/201.9 |
| 7,048,619 B2 | 5/2006 | Park |
| 7,094,304 B2 | 8/2006 | Nystrom |
| 7,095,772 B1 | 8/2006 | Delfyett et al. |
| 7,196,758 B2 | 3/2007 | Crawford |
| 7,319,566 B2 | 1/2008 | Prince |
| 7,324,286 B1 | 1/2008 | Glebov |
| 7,450,213 B2 | 11/2008 | Kim et al. |
| 7,764,426 B2 | 7/2010 | Lipson |
| 8,045,130 B2 | 10/2011 | Son |
| 8,077,388 B2 | 12/2011 | Gerton |
| 8,264,623 B2 | 9/2012 | Marrucci |
| 8,520,170 B2 | 8/2013 | Escuti |
| 8,582,094 B1 | 11/2013 | Shortt |
| 8,643,822 B2 | 2/2014 | Tan et al. |
| 8,937,701 B2* | 1/2015 | Rossini ............... G01J 9/00 345/32 |
| 8,982,313 B2 | 3/2015 | Escuti et al. |
| 9,541,772 B2 | 1/2017 | De Sio et al. |
| 9,557,456 B2 | 1/2017 | Tabirian et al. |
| 9,592,116 B2 | 3/2017 | De Sio et al. |
| 9,617,205 B2 | 4/2017 | Tabirian et al. |
| 9,658,512 B2 | 5/2017 | Tabirian et al. |
| 9,715,048 B2 | 7/2017 | Tabirian et al. |
| 9,753,193 B2 | 9/2017 | Tabirian et al. |
| 2001/0002895 A1 | 6/2001 | Kawano |
| 2001/0018612 A1 | 8/2001 | Carson et al. |
| 2001/0030720 A1 | 10/2001 | Ichihashi |
| 2002/0027624 A1 | 3/2002 | Seiberle |
| 2002/0097361 A1 | 7/2002 | Ham |
| 2002/0167639 A1 | 11/2002 | Coates |
| 2003/0021526 A1 | 1/2003 | Bouevitch |
| 2003/0072896 A1 | 4/2003 | Kwok |
| 2003/0152712 A1 | 8/2003 | Motomura |
| 2003/0206288 A1 | 11/2003 | Tabirian et al. |
| 2003/0214700 A1 | 11/2003 | Sidorin |
| 2003/0218801 A1 | 11/2003 | Korniski |
| 2004/0051846 A1 | 3/2004 | Blum |
| 2004/0105059 A1 | 6/2004 | Ohyama |
| 2004/0165126 A1 | 8/2004 | Ooi et al. |
| 2005/0030457 A1 | 2/2005 | Kuan et al. |
| 2005/0110942 A1 | 5/2005 | Ide |
| 2005/0219696 A1 | 10/2005 | Albert et al. |
| 2005/0271325 A1 | 12/2005 | Anderson et al. |
| 2005/0280171 A1 | 12/2005 | Chen |
| 2006/0008649 A1 | 1/2006 | Shinichiro |
| 2006/0055883 A1 | 3/2006 | Morris et al. |
| 2006/0109532 A1 | 5/2006 | Savas |
| 2006/0221449 A1 | 10/2006 | Glebov et al. |
| 2006/0222783 A1 | 10/2006 | Hayashi |
| 2007/0032866 A1 | 2/2007 | Portney |
| 2007/0040469 A1 | 2/2007 | Yacoubian |
| 2007/0115551 A1 | 5/2007 | Spilman |
| 2007/0122573 A1 | 5/2007 | Yasuike |
| 2007/0132930 A1 | 6/2007 | Ryu et al. |
| 2007/0247586 A1 | 10/2007 | Tabirian |
| 2007/0258677 A1 | 11/2007 | Chigrinov |
| 2008/0226844 A1 | 9/2008 | Shemo |
| 2008/0278675 A1 | 11/2008 | Escuti |
| 2009/0002588 A1 | 1/2009 | Lee et al. |
| 2009/0073331 A1 | 3/2009 | Shi |
| 2009/0122402 A1 | 5/2009 | Shemo |
| 2009/0141216 A1 | 6/2009 | Marrucci |
| 2009/0201572 A1 | 8/2009 | Yonak |
| 2009/0256977 A1 | 10/2009 | Haddock |
| 2009/0257106 A1 | 10/2009 | Tan |
| 2009/0264707 A1 | 10/2009 | Hendricks |
| 2010/0003605 A1 | 1/2010 | Gil |
| 2010/0066929 A1 | 3/2010 | Shemo |
| 2011/0069377 A1 | 3/2011 | Wu et al. |
| 2011/0075073 A1 | 3/2011 | Oiwa |
| 2011/0085117 A1 | 4/2011 | Moon et al. |
| 2011/0097557 A1 | 4/2011 | May |
| 2011/0109874 A1 | 5/2011 | Piers et al. |
| 2011/0135850 A1 | 6/2011 | Saha et al. |
| 2011/0188120 A1 | 8/2011 | Tabirian et al. |
| 2011/0234944 A1 | 9/2011 | Powers |
| 2011/0262844 A1 | 10/2011 | Tabirian |
| 2012/0140167 A1 | 6/2012 | Blum |
| 2012/0162433 A1 | 6/2012 | Fuentes Gonzalez |
| 2012/0188467 A1 | 7/2012 | Escuti |
| 2013/0057814 A1 | 3/2013 | Prushinskiy et al. |
| 2013/0202246 A1 | 8/2013 | Meade |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0023993 A1 | 1/2016 | Tabirian |
| 2016/0047955 A1 | 2/2016 | Tabirian |
| 2016/0047956 A1 | 2/2016 | Tabirian et al. |
| 2016/0363484 A1* | 12/2016 | Barak ............... G01J 9/02 |
| 2017/0010397 A1 | 1/2017 | Tabirian et al. |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Martinez-Cuenca, et al., Reconfigurable Shack-Hartmann Sensor Without Moving Elements, Optical Society of America, May 2010, pp. 1338-1340, vol. 35, No. 9.

Tabiryan, et al., The Promise of Diffractive Waveplates, OPN Optics and Photonics News, Mar. 2010, 6 pages.

Tabiryan, et al., Fabricating Vector Vortex Waveplates for Coronagraphy; Aerospace Conference, 2012, EEE; publicly available Apr. 19, 2012, 12 pages.

Nersisyan, et al., Study of azo dye surface command photoalignment material for photonics applications, Applied Optics, vol. 49, No. 10, Apr. 1, 2010, 8 pages.

Niersisyan, et al., Characterization of optically imprinted polarization gratings, Applied Optics, vol. 48, No. 21, Jul. 20, 2009, 6 pages.

Nersisyan, et al., Fabrication of Liquid Crystal Polymer Axial Waveplates for UV-IR Wavelengths, Optics Express, vol. 17, No. 14, Jul. 2009, 9 pages.

Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.

Nersisyan, et al., Polarization insensitive imaging through polarization gratings, Optics Express, vol. 17, No. 3, Feb. 2, 2009, 14 pages.

Sarkissian, et al., Longitudinally modulated nematic bandgap structure, Optical Society of America, vol. 23, No. 8, Aug. 2008, 6 pages.

(56) References Cited

OTHER PUBLICATIONS

Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst., vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
Mceldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Naves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process, Jpn. J. Appl. Phys., Part 1, vol. 42, 2003, 3 pages.
Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Serak, S., et al., High-efficiency 1.5 mm Thick Optical Axis Grating and its Use for Laser Beam Combining, Optical Society of America, vol. 32, No., Jan. 2007, 4 pages.
Ono et al., Effects of phase shift between two photoalignment substances on diffration properties in liquid crystalline grating cells, Appl. Opt. vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficent thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2, 2009, 14 pages.
OISE, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.
Tabiryan, et al., Broadband waveplate lenses, Optics Express 7091, vol. 24, No. 7, Mar. 24, 2016, 12 pages.

(56) References Cited

OTHER PUBLICATIONS

Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers".
Barrett et al., Model of laser driven mass transport in thin films of dye-functionalized polymers, J. Chem. Phys., vol. 109 (4), Jul. 22, 1998, 13 pages.
Tabirian, U.S. Appl. No. 14/214,375, filed Mar. 14, 2014, Office Action Summary dated Jun. 27, 2017, 10 pages.
Tabirian, et al., U.S. Appl. No. 14/688,425, filed Apr. 16, 2015, Office Action Summary dated Oct. 5, 2017, 10 pages.
Serak, et al. Diffractive Waveplate Arrays [Invited], Journal of the Optical Society of America B, May 2017, pp. B56-B63, vol. 34, No. 5, 8pages.
Emoto, et al, Optical & Physical Applications of Photocontrollable Materials: Azobenzene-Containing & Liquid Crystalline Polymers, Polymers, Jan. 2012, 150-186, vol. 4, 38 pgs.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microrubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Beam Engineering for Advaced Measurements Co., et al., PCT Application No. PCT/US2016/038666 filed Jun. 22, 2016, Notification of Transmittal of the International Search.
Tabirian, N., Utility U.S. Appl. No. 14/194,808, filed Mar. 2, 2014, Office Action Summary dated Feb. 9, 2018, 10 pages.
Tabirian, N., Utility U.S. Appl. No. 14/324,126, filed Jul. 4, 2014, Office Action Summary dated Feb. 8, 2018, 13 pages.
Tabirian, N., Utility U.S. Appl. No. 151189,551, filed Jun. 22, 2016, Office Action Summary dated Feb. 27, 2018, 16 pages.

* cited by examiner

FULL CHARACTERIZATION WAVEFRONT SENSOR

CROSS REFERENCE TO RELATED APPLICATIONS

This application claims the benefit of priority to U.S. Provisional Patent Application Ser. No. 62/186,622 filed Jun. 30, 2015. The entire disclosure of the application listed in this paragraph is incorporated herein by specific reference thereto.

FIELD OF INVENTION

This invention relates to optical sensors, and in particular to sensors, devices, apparatus, systems and methods for laser beam and optics characterization, replacing microlens arrays with one or more switchable diffractive waveplate microlens arrays for providing wavefront and light intensity measurements with higher resolution and wider dynamic range of characteristics than are possible using prior art, thus allowing more complete and precise characterization of optical wavefronts and beam profiles.

BACKGROUND AND PRIOR ART

Sensors such as a Shack-Hartmann wavefront sensor are often used to characterize the spatial characteristics of optical wavefronts, including the spatial characteristics of laser beams. Sensors of this type employing prior art may include a charge-coupled device (CCD) or complementary metal-oxide-semiconductor (CMOS) focal plane array (FPA), or other type of FPA, to detect optical radiation, such as laser radiation. In such sensors, a microlens array is placed in front of the CCD, CMOS, or other image sensor, and the wavefront slope at a number of transverse locations of the wavefront is determined by measuring the location of the centroid of the focal spots formed by each lenslet of the microlens array.

Although the prior art wavefront sensors, including Shack-Hartmann wavefront sensors, allow for extensive and useful characterization of optical beams, these sensors are limited in their wavefront sensing capability due to limitations imposed by two major factors. The first factor is the limitation on spatial resolution of the microlens array used in these sensors. The second factor is the limitation on angular resolution imposed by the focal length of the microlenses composing the microlens array, combined with the pitch of the CCD, CMOS, or other image sensor used to detect the optical beam.

The spatial resolution of a wavefront sensor constructed using the prior art is determined by the pitch of the microlens array, that is, the distance between centerlines of adjacent microlenses of the array. The spatial resolution cannot be indefinitely increased by the manufacturer because reducing the pitch (thus obtaining a higher spatial resolution) while keeping the microlens focal length constant also reduces the range of wavefront slopes measureable by the wavefront sensor.

The angular resolution of a wavefront sensor of the Shack-Hartmann type is determined by the focal length of the individual microlenses of the microlens array and the pitch of the CCD, CMOS, or other image sensor used to detect the focused spots produced by the microlens array. The angular resolution of the wavefront sensor cannot be indefinitely increased by the manufacturer by increasing the focal length of the microlenses because increasing the focal length (thus obtaining greater angular resolution) while keeping the pitch of the microlens array constant also reduces the range of wavefront slopes measureable by the wavefront sensor.

For any given wavefront sensing task, there will typically be an optimum combination of values of the pitch and focal length of the microlens array, such that the wavefront sensor is capable of measuring the full range of wavefront tilts that are present in the measured wavefront, and also provides adequate spatial resolution. A fixed microlens array with fixed pitch and fixed focal length will not be optimal for every wavefront measurement task encountered by users.

One method that has been used in prior art to allow optimization of a Shack-Hartmann wavefront sensor for each particular wavefront sensing task is the provision of field-replaceable microlens arrays. With this method, the user picks a microlens array for each wavefront measurement task, and installs it into the wavefront sensor. Typically, a lengthy and difficult calibration procedure must be performed each time the microlens array is removed and replaced. The process of removing and replacing the microlens array thus becomes time-consuming and expensive.

A Shack-Hartmann wavefront sensor constructed using prior art provides measurements of the beam power density with a spatial sampling period equal to the period of the microlens array. For measurements in which it would be valuable to measure the beam power density with a period smaller than the period of the microlens array, the microlens array could be removed, thereby offering the opportunity to measure the beam power density with a sampling period equal to the pitch of the CCD, CMOS, or other image sensor. However, as noted above, removing and replacing the microlens array is, if it is possible at all, a time-consuming and expensive process.

Thus, there is a need for a wavefront sensor that can be optimized by the user, or automatically by the wavefront sensor system, without the need for removal and replacement of the microlens array.

SUMMARY OF THE INVENTION

A primary objective of the present invention is to provide sensors, devices, apparatus, systems and methods for replacing non-switchable microlens arrays based on prior art with one or more switchable diffractive waveplate microlens arrays for providing useful measurements of wavefronts with a wider range of characteristics for allowing more complete characterization of optical wavefronts.

The present invention includes innovations relating to replacement of the non-switchable microlens arrays in wavefront sensors with one or more electrically-switchable microlens arrays. This makes it possible to optimize the microlens characteristics for each wavefront sensing application either manually, or automatically. Specific characteristics to be optimized by means of the switchable microlens array or arrays include focal length and pitch.

The present invention therefore includes disclosure of methods of fabricating Shack-Hartmann wavefront sensors that contain switchable diffractive waveplate microlens arrays.

The wavefront sensor of the present invention may employ one or more diffractive waveplate microlens arrays.

The wavefront sensor of the present application may employ one or more liquid crystal microlens arrays.

The wavefront sensor of the present invention can employ methods of wavefront analysis using multiple settings of a switchable diffractive waveplate microlens array, for example using one setting to obtain a beam profile with high spatial resolution, and another setting to obtain measurements of wavefront slope.

The wavefront sensor of the present invention can include a plurality of microlens arrays, all of which have the same focal length, but each of which as different spacings between adjacent lenslets.

The wavefront sensor of the present invention can include a plurality of microlens arrays, all of which have the same spacings between adjacent lenslets, but each of which has different focal lengths.

The wavefront sensor of the present invention can include a polarization selector in order to assure that the focal power of the lenslets of the array of diffractive waveplate lenses has the desired sign, in the case that the microlens array is a diffractive waveplate microlens array.

The wavefront sensor of the present invention can employ a plurality of microlens arrays in order to adapt to input beams of different wavelengths. A Shack-Hartmann wavefront sensor, can include at least one switchable microlens array, an optical sensor array, and an electronics system for reading, analyzing and displaying the output of the optical sensor array in order to derive the phase of optical wavefronts and intensity distribution in the beam incident on the wavefront sensor.

The switchable microlens array can include at least one switchable diffractive waveplate microlens array.

The switchable microlens array can include at least one switchable liquid crystal microlens arrays.

The electronics system for reading, analyzing and displaying the output of the optical sensor array can allow for measurements of a wavefront and intensity distribution of the incident beam for varying settings of the switchable diffractive waveplate microlens array.

The switchable microlens arrays can have the same microlens pitch.

At least part of the plurality of switchable microlens arrays can have different pitch.

The wavefront sensor can further include a polarizer at the input of the sensor.

A Shack-Hartmann sensor system, can include at least two switchable microlens for receiving an optical wavefront, and an optical sensor array having a plurality of pixels, where the switchable microlens array focuses the optical wavefront on a focal spot of the array.

The at least two switchable microlens arrays can include a first switchable microlens array in parallel and spaced apart from a second switchable microlens array.

The optical detector array can include a focal plane array (FPA).

The optical detector array can include a CCD (charge-coupled device) array.

The optical detector array can include a CMOS (complementary metal-oxide semiconductor) array.

A Shack-Hartmann sensor system, can include a plurality of microlens arrays, wherein optical power of the plurality of microlens arrays is cycled between focusing and non-focusing states allowing to complement the wavefront measurement obtained in focusing state with beam intensity profile measurement in non-focusing state.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
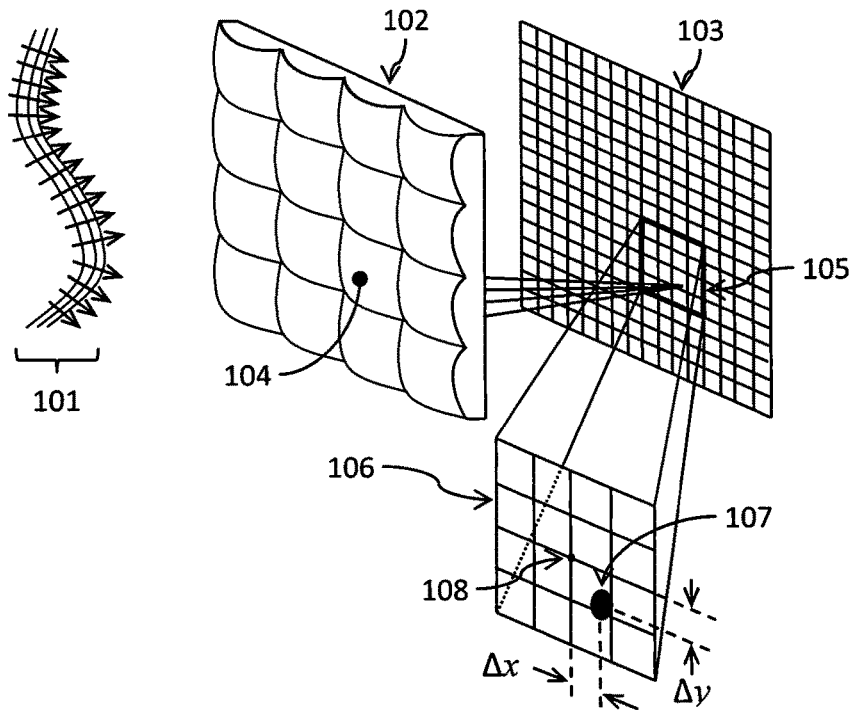
FIG. 1 illustrates prior art of wavefront characterization using a Shack-Hartmann wavefront sensor.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention includes devices, apparatus, systems and methods for creating a wavefront sensor that can more fully characterize an optical beam, such as a laser beam, than is possible employing sensors based on the prior art. In particular, methods are disclosed to replace the single, static (non-switchable) microlens array employed in prior art with one or more switchable microlens arrays.

A list of the components in the figures will now be described.

101 optical wavefront
102 micro lens array
103 focal plane array (FPA)
104 individual micro lens 105 focused area
106 expanded (enlarged) pixel
107 focal spot
108 position if optical beam were a plane wave
201 input wavefront
202 optical axis
203 microlens
204 photodetector optical array (CCD, CMOS, or other FPA)
205 focal spot
301 optical wavefront
302 optical axis
303 first switchable microlens
304 second switchable microlens
305 optical array (CCD, CMOS or other FPA)
401 input wavefront
402 axis
403 microlens
404, 405 half microlenses
406 optical array (CCD, CMOS or other FPA)

FIG. 1 illustrates the optical layout and function of a Shack-Hartmann wavefront sensor using prior art. An optical wavefront 101 with spatially-dependent direction of propagation is incident on a wavefront sensor that includes a microlens array 102 and a CCD (charge-coupled device), CMOS (complementary metal-oxide semiconductor), or other FPA (focal plane array) 103. The microlens array can consist of a plurality of individual microlenses such as 104. The optical radiation from each microlens is focused into an area 105 of the FPA 103 that contains an integer number of pixels along each axis.

For the specific case illustrate in FIG. 1, each microlens brings light to a focus within an area 105 of the FPA 103 that can be, for purposes of illustration, 4 pixels by 4 pixels in area. For example, microlens 104 focuses light into area 105 that consists of 16 pixels, with an extent of 4 pixels in the horizontal direction and 4 pixels in the vertical direction.

An expanded view 106 of this 4 pixel by 4 pixel region is shown in FIG. 1. In this expanded view, a focal spot 107 is indicated. The focal spot 107 is offset by a distance Δx in the horizontal direction, and Δy in the vertical direction, from the position 108 that the focal spot would occupy if the input optical beam were a plane wave with a propagation direction perpendicular to the parallel planes of the microlens array 102 and the FPA 103. The centroid offsets Δx and Δy, in combination with the focal length of the microlenses, can be used by the wavefront sensor to determine the slope of the wavefront at each microlens of the array.

Figure 2:
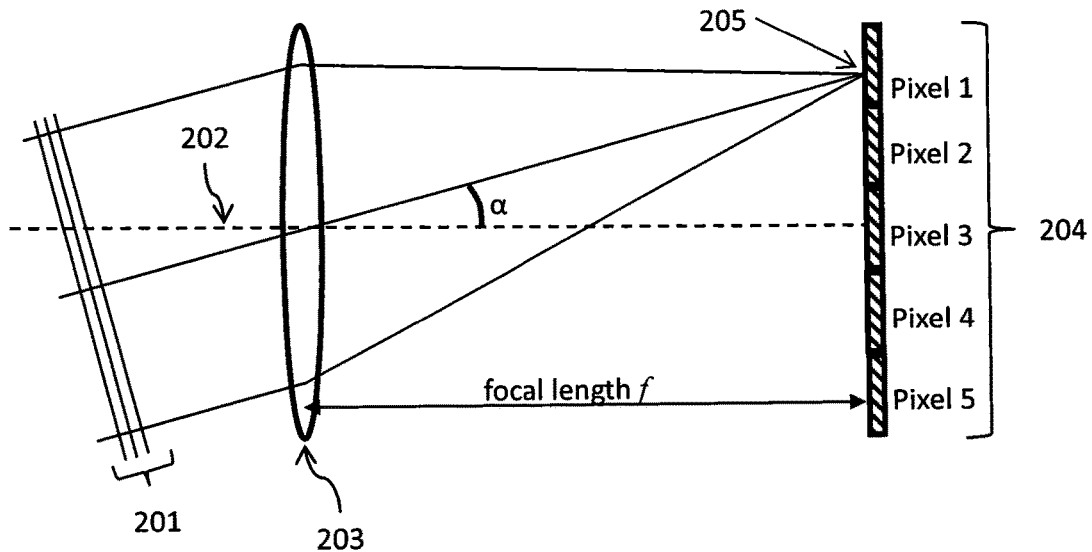
FIG. 2 illustrates the prior art optical layout of one single microlens of the microlens array used in Shack-Hartmann wavefront sensors, and the CCD, CMOS, or other type of photodetector pixels associated with said single microlens.

FIG. 2 further illustrates the optical layout and function of a Shack-Hartmann wavefront sensor using the prior art. In FIG. 2 the optical layout is shown that allows the local slope of the input wavefront 201 to be measured relative to the optical axis 202 of an individual microlens 203. A plurality of CCD, CMOS, or other photodetector pixels 204 is used to determine the offset of the focal spot centroid 205 from the axis 202 of the microlens 203. The local angular offset a of the direction of beam propagation relative to the optical axis 202 is determined by dividing the offset of the centroid by the focal length f of the microlens.

The constraints on measurements by the wavefront sensor based on prior art can be illustrated by reference to FIG. 1 and FIG. 2. With a Shack-Hartmann wavefront sensor based on the prior art, the slope of the wavefront is measured with a spatial sampling period equal to the pitch of the microlens array 102 in FIG. 1. In this context, "pitch of the microlens array" means the center-to-center separation of adjacent microlenses comprising the microlens array. The signal level in the focal spot (107 in FIGS. 1 and 205 in FIG. 2) is a measure of the average beam power density over the area of the individual microlens, so the spatial sampling period for beam power density is the same as the spatial sampling period of the wavefront slope, and is equal to the pitch of the microlens array. The maximum wavefront angle relative to an axis perpendicular to the plane of the microlens array and the plane of the FPA that can be measured with the wavefront sensor architecture illustrated in FIG. 1 and FIG. 2 is approximately one half the diameter of the microlens divided by the focal length f of the microlens for typical image processing methods.

Using the prior art methods illustrated in FIG. 1 and FIG. 2, the spatial sample period and the range of wavefront slopes are fixed by the design of the sensor, and the spatial sampling period of beam power density is the same as for wavefront slope, and equal to the pitch of the microlens array. Although these constraints are fixed for a given wavefront sensor design, users are confronted with a wide variety of measurement requirements that may or may not fall within the measurement constraints of a single wavefront sensor. As noted, some manufacturers resort to providing field-replaceable microlens arrays in order to provide some flexibility in measurement capability, but this approach prevents rapid adaptation of a single sensor to new measurement requirements.

The possibility of the user of a wavefront sensor of the Shack Hartmann type electronically switching the optical characteristics of a microlens array, instead of the user having to physically replace one fixed microlens array with another fixed microlens array with different optical characteristics, such as focal length and pitch is enabled by the recent development of switchable diffractive waveplate lenses. Particularly, the lens array function can be switched off altogether allowing high resolution imaging of the beam intensity profile.

Such switchable diffractive waveplate lenses are described and shown, for example, in U.S. patent application Ser. No. 14/688,256 filed Apr. 16, 2015 to Tabirian et al. entitled "Diffractive Waveplate Lenses for Correcting Aberrations and Polarization-Independent Functionality", which is co-assigned to the same assignee as the subject invention, and which is incorporated by reference in its' entirety. Such devices can be fabricated in many forms, including as microlens arrays, and the like.

An additional possible form of the microlens array of the present invention is that of an array of liquid crystal microlenses. Such microlenses can be produced, in particular, between two glass substrates comprising transparent electrodes such as Indium Thin Oxide (ITO), Graphene, Graphene oxide based compositions, and the like. Liquid crystal polymer microlenses can be combined with a liquid crystal variable half-wave phase retarder in-between to provide switching function between non-focusing and focusing states.

As a first embodiment of the present invention, the fixed, static microlens array 102 of FIG. 1 of the prior art would be replaced with a switchable microlens array. Consecutive measurements would be made with the microlens array switched on for wavefront slope measurements, and with the microlens array switched off for measurements of the spatial distribution of beam power density. This would greatly reduce the spatial sampling period of the beam power density, thereby providing a much more complete spatial beam profile than is provided by Shack-Hartmann wavefront sensors based on prior art.

As an example, Shack-Hartmann wavefront sensors currently available for purchase, employing CCD or CMOS image sensors, are such that the pitch of the microlens array is 30 to 65 times the pitch of the CCD or CMOS image sensor, and (as previously noted) the spatial sampling period for both wavefront slope and beam power density is equal to the pitch of the microlens array. If the microlens array could be switched off, the same CCD or CMOS image sensor could be used to sample the beam power density with a sampling period 30 to 65 times smaller than is the case with these existing available Shack-Hartmann wavefront sensors.

Figure 3A:
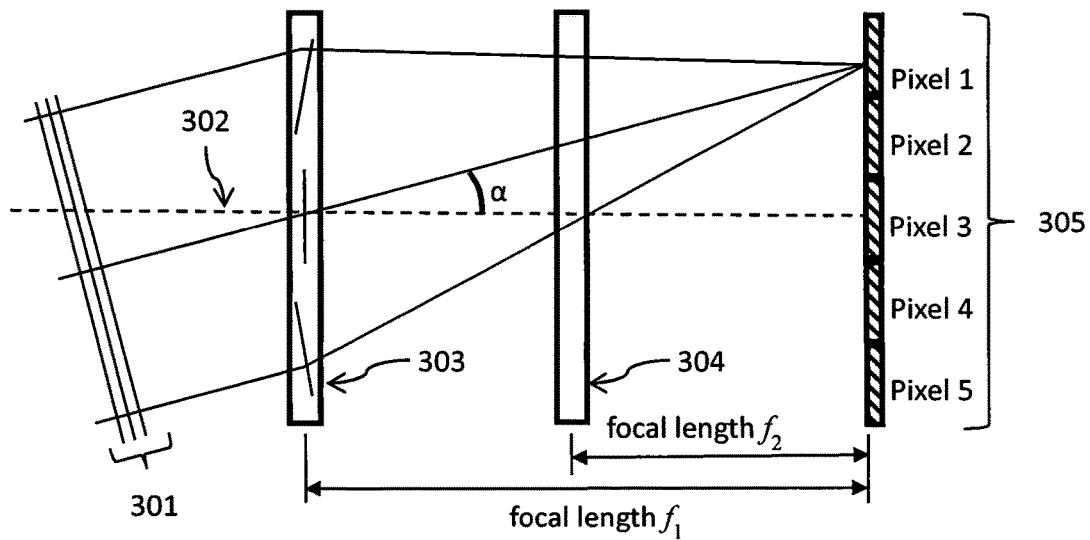
FIGS. 3A and 3B illustrate the optical layout of one embodiment of the present invention in which the single non-switchable microlens array of the prior art is replaced with two switchable microlens arrays. In the embodiment illustrated in FIGS. 3A and 3B, each switchable microlens array is at a different distance from the CCD, CMOS, or other focal plane array (FPA). The pitches of the two switchable microlens arrays in the embodiment illustrated in FIGS. 3A and 3B are the same.
Figure 3B:
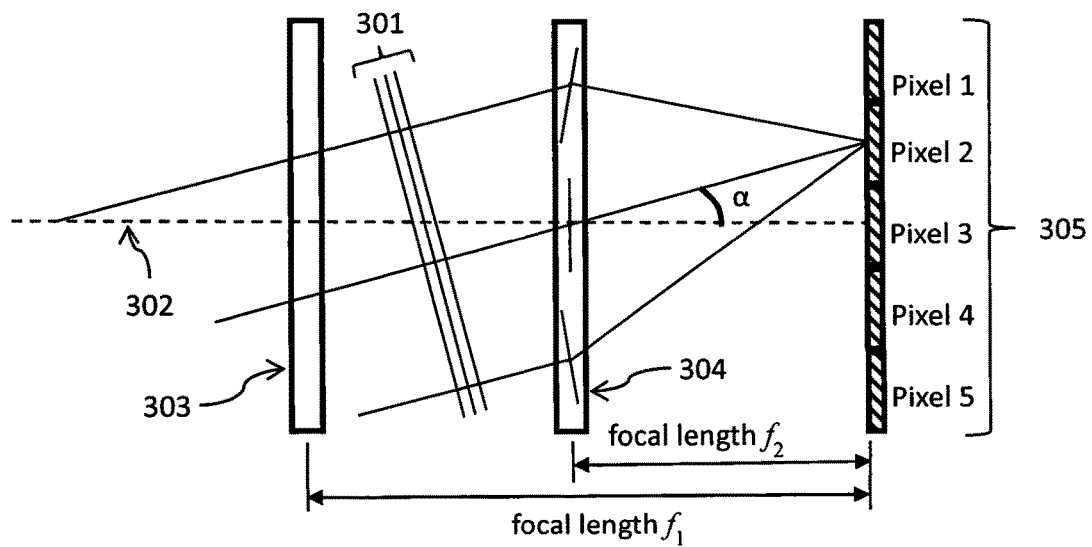

A first embodiment of the present invention is illustrated in FIGS. 3A and 3B. In this embodiment, the single unswitched microlens array of a wavefront sensor such as the one illustrated in FIG. 1 is replaced by two switchable microlens arrays at different distances from the FPA. In the embodiment of the present invention illustrated in FIGS. 3A and 3B, an optical wavefront 301 that is propagating nearly parallel to optical axis 302 is incident on a first switchable microlens 303, one of the microlenses of a microlens array, followed by a second switchable microlens 304.

As was the case illustrated in FIG. 2 for the prior art case of a single non-switchable microlens, the microlenses 303 and 304 in FIGS. 3A and 3B are single elements of an array of microlenses. In FIG. 3A, the microlens array furthest from the CCD, CMOS, or other FPA brings the input radiation to a focus on Pixel 1 of the FPA 305. As is evident for the example illustrated in FIG. 3A, the wavefront slope is so great and the angle α that the local optical propagation direction makes with the optical axis 302 is so large that the focal spot is at the edge of the set of pixels 305 associated with the microlenses 303 and 304. If the microlens array of which microlens 303 is a part is switched off, and the microlens array of which microlens 304 is a part is switched on, as illustrated in FIG. 3B, then the focal spot is brought to a focus on the FPA pixels 305 at a position closer to the axis. This is because the focal length $f_2$ of microlens 304 is shorter than the focal length $f_1$ of microlens 303.

From the user point of view, the major difference between the sensor configuration illustrated in FIG. 3A and the sensor configuration illustrated in FIG. 3B is that the precision with which wavefront slopes can be measured is higher in the configuration of FIG. 3A, but the range of measureable wavefront slopes is greater for the configuration of FIG. 3B. Depending on the characteristics of the wavefront to be measured, either one of the configurations illustrated in FIG. 3A and FIG. 3B could be closer to optimal. By providing the ability to switch the lenses on and off, the sensor can provide closer to an optimal combination of wavefront slope range and precision for a wider variety of wavefronts than would be the case with a fixed microlens array.

Figure 4A:
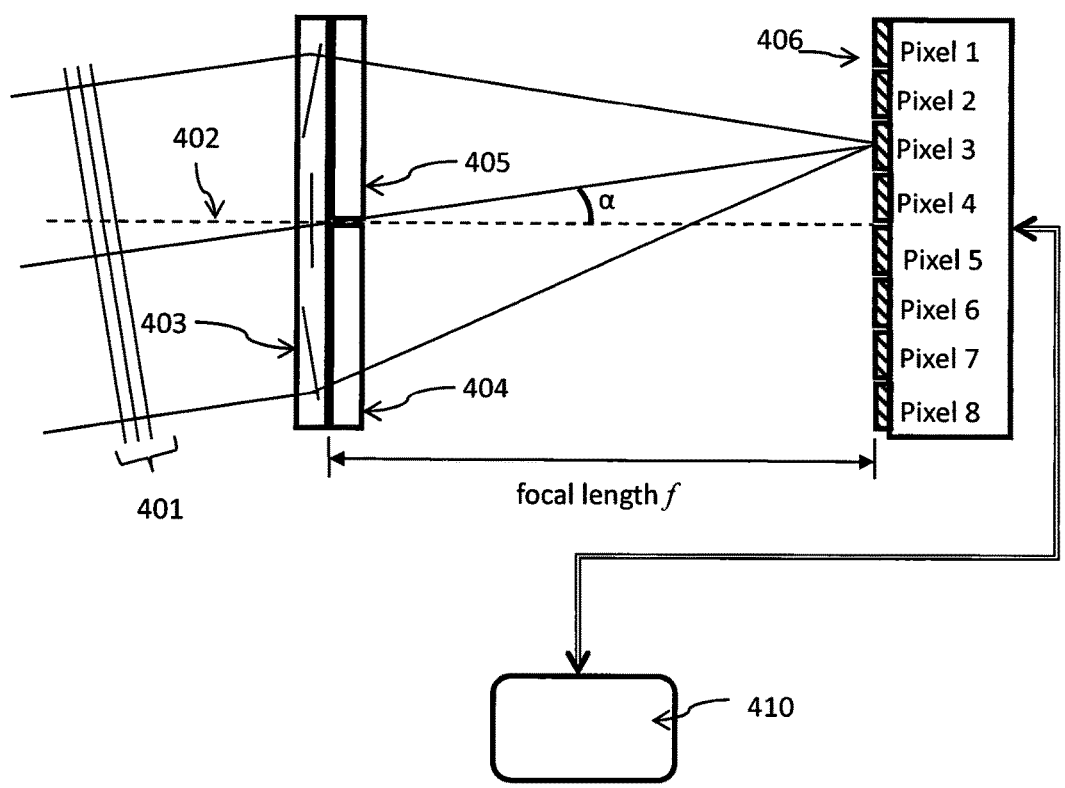
FIGS. 4A and 4B illustrate the optical layout of another embodiment of the present invention in which the single non-switchable microlens array of the prior art is replaced with two switchable microlens arrays. In the embodiment illustrated in FIGS. 4A and 4B, each switchable microlens array is at essentially the same distance from the CCD, CMOS, or other FPA. The pitches of the two switchable microlens arrays in the embodiment illustrated in FIGS. 4A and 4B are different.
Figure 4B:
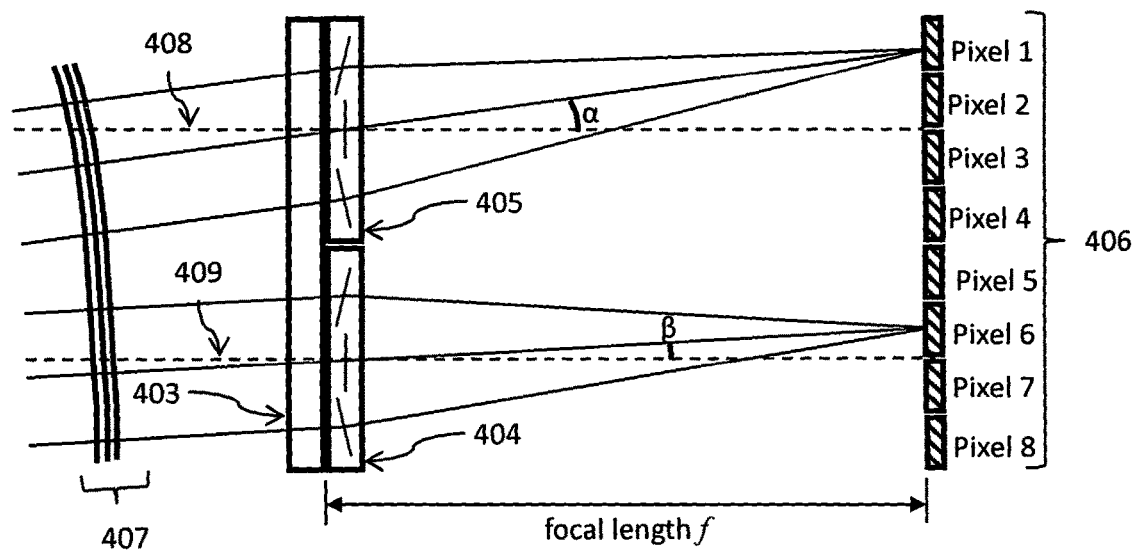

A second embodiment of the present invention is illustrated in FIGS. 4A and 4B. In this embodiment, there are again two switchable microlens arrays as was the case for the embodiment illustrated in FIGS. 3A and 3B. However, for the embodiment illustrated in FIGS. 3A and 3B, the focal lengths of the two microlens arrays are different, whereas in the embodiment illustrated in FIGS. 4A and 4B, the focal lengths of the two microlens arrays are the same.

Also, for the embodiment illustrated in FIGS. 3A and 3B, the pitches of the two microlens arrays are the same, whereas in the embodiment illustrated in FIGS. 4A and 4B, the pitch of the microlens array that includes microlenses 404 and 405 is half as large as the pitch of the microlens array that includes microlens 403. Therefore, for the embodiment illustrated in FIGS. 4A and 4B, the spatial sampling density of the incoming wavefront slope can be adjusted by switching one or the other of the two microlenses on or off.

FIGS. 4A and 4B give examples of two wavefront measurement cases.

In FIG. 4A an example is illustrated in which the angle α between the direction of propagation of the input wavefront 401 relative to the optical axis 402 of the microlens 403 varies slowly with transverse position, so the large pitch of the microlens array of which microlens 403 is a part is sufficient.

In FIG. 4B an example is illustrated in which the angular offset of the direction of wavefront propagation of the input wavefront 407 from the optical axes 408 and 409 varies from a relatively large value α at the center of microlens 405 to a smaller value β at the center of microlens 404. The configuration of FIG. 4A allows more precise measurement of wavefront slope over a wider range of wavefront slopes than the configuration of FIG. 4B, but the configuration of FIG. 4B allows measurements of wavefront slope with higher rates of change of wavefront slope with transverse position than does the configuration of FIG. 4A.

The size of sensor array elements 406 in FIG. 4B can be as small as approximately 3 micrometers and as large as approximately 30 micrometers with sensitivity from UV (ultra violet) to infrared wavelengths. The output signal of the optical sensors is transferred to an electronics system for processing and display 410 such as a computer.

Depending on the characteristics of the wavefront to be measured, either one of the configurations illustrated in FIGS. 4A and 4B could be closer to optimal. By providing the ability to switch the lenses on and off, the sensor can provide closer to an optimal combination of wavefront slope range and sampling period for a wider variety of wavefronts than would be the case with a fixed microlens array. Example of wavefronts includes parabolic profiles typically outputted by conventional lenses, spiral wavefronts outputted by spiral phase plates, and complex irregular wavefronts obtained in solid state laser beams, etc.

For any embodiment of the disclosed invention, it would be possible to take advantage of the capabilities of the switchable microlens array by employing software that adapts the sensor configuration to the measured wavefront, or makes consecutive measurements of the same wavefront in multiple configurations of the sensor in order to enhance the accuracy and completeness of the wavefront characterization.

As will be evident to those skilled in the art, there are many variations of the disclosed invention, including, but not limited to, the use of different types of FPAs for wavefront sensors operating in different regions of the electromagnetic spectrum; various combinations of different types of switchable diffractive waveplate microlens arrays; polarization selectors to optimize the wavefront measurement capability and account for the dependence on light polarization of the focusing properties of diffractive waveplate elements; switchable diffractive microlens arrays based on switchable liquid crystal microlenses; and the ability to select (either automatically or manually) one or more switchable microlens arrays that are optimal for a particular range of wavefront wavelengths.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A Shack-Hartmann wavefront sensor, comprising:
a sequence of switchable diffractive waveplate microlens arrays in series;
an optical sensor array having an output; and
an electronics system for reading, analyzing and displaying the output of the optical sensor array in order to derive the phase of optical wavefronts and intensity distribution in a beam incident on the Shack-Hartmann wavefront sensor.

2. The wavefront sensor of claim 1 in which the sequence of switchable microlens arrays comprises at least one switchable diffractive waveplate liquid crystal microlens arrays.

3. The wavefront sensor of claim 1 in which the electronics system for reading, analyzing and displaying the output of the optical sensor array allows measurements of a wavefront and intensity distribution of the incident beam for varying settings of the switchable diffractive waveplate microlens arrays.

4. The wavefront sensor of claim 1 in which at least two switchable diffractive waveplate microlens arrays in the sequence have the same microlens pitch.

5. The wavefront sensor of claim 1 in which at least part of the switchable diffractive waveplate microlens arrays in the sequence have a different pitch.

6. The wavefront sensor of claim 1, further comprising a circular polarizer at the input of the optical sensor array.

7. A Shack-Hartmann sensor system, comprising:
a sequence of at least two switchable diffractive waveplate microlens arrays in series for receiving an optical wavefront; and
an optical sensor array having a plurality of pixels, wherein the sequence of at least two switchable diffractive waveplate microlens arrays focuses the optical wavefront on a focal spot of the optical sensor array for the Shack-Hartmann sensor system.

8. The sensor system of claim 7, wherein the sequence of the at least two switchable diffractive waveplate microlens arrays includes:
a first switchable microlens array in parallel and spaced apart from a second switchable microlens array.

9. The sensor system of claim 7, wherein the optical detector array includes:
a focal plane array (FPA).

10. The sensor system of claim 7, wherein the optical sensor array includes:
a CCD (charge-coupled device) array.

11. The sensor system of claim 7, wherein the optical sensor array includes:
a CMOS (complementary metal-oxide semiconductor) array.

12. A Shack-Hartmann sensor system for wavefront and intensity profile measurement of light beams, comprising:
a sequence of diffractive waveplate microlens arrays in series, wherein optical power of the sequence of diffractive waveplate microlens arrays is cycled between focusing and non-focusing states allowing to combine wavefront measurement of a light beam in focusing state with beam intensity profile measurement in non-focusing state for the Shack-Hartmann sensor system.

* * * * *